US009202238B2

(12) United States Patent
Harris

(10) Patent No.: US 9,202,238 B2
(45) Date of Patent: Dec. 1, 2015

(54) INFORMATION PROCESSING AND TRANSMISSION SYSTEMS

(76) Inventor: Nathan Harris, Huntingdon (GB)

( * ) Notice: Subject to any disclaimer, the term of this patent is extended or adjusted under 35 U.S.C. 154(b) by 899 days.

(21) Appl. No.: 12/322,213

(22) Filed: Jan. 30, 2009

(65) Prior Publication Data

US 2010/0023616 A1 Jan. 28, 2010

(51) Int. Cl.
*G06F 15/16* (2006.01)
*G06Q 30/04* (2012.01)

(52) U.S. Cl.
CPC .................................... *G06Q 30/04* (2013.01)

(58) Field of Classification Search
USPC ................................ 709/230, 232, 224, 225
See application file for complete search history.

(56) References Cited

U.S. PATENT DOCUMENTS

| | | | | |
|---|---|---|---|---|
| 7,212,962 | B2 * | 5/2007 | Masushige et al. | 703/24 |
| 7,346,546 | B2 * | 3/2008 | Anderson | 705/26 |
| 7,356,046 | B2 * | 4/2008 | Harley, Jr. | 370/466 |
| 7,581,031 | B2 * | 8/2009 | Konz et al. | 709/250 |
| 7,626,992 | B2 * | 12/2009 | Purpura | 370/401 |
| 2004/0243707 | A1 * | 12/2004 | Watkinson | 709/225 |
| 2005/0034070 | A1 * | 2/2005 | Meir et al. | 715/530 |
| 2005/0144268 | A1 * | 6/2005 | El-Batal et al. | 709/223 |
| 2006/0200547 | A1 * | 9/2006 | Edwards et al. | 709/224 |
| 2006/0218090 | A1 * | 9/2006 | Luettge et al. | 705/40 |
| 2007/0244778 | A1 * | 10/2007 | Bailard | 705/35 |
| 2008/0034099 | A1 * | 2/2008 | Kageyama | 709/228 |
| 2008/0105743 | A1 * | 5/2008 | Mills | 235/441 |
| 2008/0261515 | A1 * | 10/2008 | Cohn et al. | 455/3.06 |
| 2010/0016994 | A1 * | 1/2010 | Hansen et al. | 700/9 |

* cited by examiner

*Primary Examiner* — Jason Recek
(74) *Attorney, Agent, or Firm* — Locke Lord LLP; Barry Kramer; Christopher J. Capelli

(57) ABSTRACT

Disclosed are systems and methods for transmitting information from a remote location to a financial decision system. In certain representative transmission methods machine readable content is generated that is adapted to be received by a financial decision system. The machine readable content is transmitted using a first protocol or standard. The transmission of machine readable content is received and converted from the first protocol to a second protocol or standard. The machine readable content is then transmitted using the second protocol. The first protocol can be a non-packet switched serial protocol, such as RS-232. The second protocol can be a packet-switched Internet Protocol (IP), such as for example, User Datagram Protocol (UDP) or Transmission Control Protocol (TCP).

29 Claims, 8 Drawing Sheets

INFORMATION PROCESSING AND TRANSMISSION SYSTEMS

BACKGROUND OF THE INVENTION

1. Field of the Invention

The present invention is directed to information processing and transmission systems and methods, and more particularly to, systems and methods for distributing or transmitting information, such as financial news, over a network from a remotely located client device (e.g., workstation or laptop) to one or more recipients or end users, wherein a first portion of the transmission uses a first communication protocol or standard and a second portion of the transmission uses a second communication protocol which is distinct from the first.

2. Background of the Invention

Certain market moving data, such as economic data, is released to news organizations in a secure lockup in which all communications with the outside world are prohibited until a designated "release time." The market moving data is provided to news organizations in such a manner in order to ensure that each news agency receives the information simultaneously and has the opportunity to provide the information to their clients simultaneously.

For example, a governmental entity, such as the Department of Labor, will release important economic statistics (e.g., employment data) in a secure lockup to a selected group of news agencies. Typically, a lockup has a workspace where the journalists can work on their laptops or workstations. Most companies have permanent equipment stationed in a lockup which is connected by Wide Area Network (WAN) circuits to their company's network or data center or directly to their clients.

During a lockup or "embargo period," all communications from the laptops and/or workstations located within the lockup are disabled by using, for example, an isolation switch (also referred to herein as a gang switch). After the time-sensitive market moving data is communicated to the journalists, the journalists are typically given 30 to 60 minutes (depending on the rules for that lockup environment) to digest and/or read the information and prepare a transmission (e.g. story, data, etc.) that is to be transmitted to their network and on to their subscribers at the "release time."

In many lockups, the network communications are restored at exactly the "release time" by opening the isolation switch and these sites will be referred to herein as "no grace" sites or lockups. In other lockup environments, called "grace" sites, electronic communications are restored by opening the isolation switch prior to the "release time." For example, in certain "grace" sites, the isolation switch is opened several minutes before the release time and the journalists are entrusted to refrain from transmitting their communications until exactly the "release time", often given via a countdown.

In certain applications, the information transmitted by the journalist includes machine readable data or content which is adapted and configured to be read by a software application which extracts out the relevant financial information and executes a trade or a series of trades based on the data. (e.g., algorithmic trading). Algorithmic trading or automated trading, also known as algo trading, black-box trading, or robo trading, is the use of computer programs for entering trading orders with the computer algorithm deciding on certain aspects of the order such as the timing, price, or even the final quantity of the order. Algorithmic trading is widely used by hedge funds and similar market participants to make the decision to initiate orders based on information that is received electronically, before human traders are even aware of the information. The investment decision and implementation may be augmented at any stage with human support or may operate completely automatically.

Therefore, the speed at which the data is received by the market participants or algorithmic trading system is crucial and even a millisecond or several hundred microseconds difference in the transmission time can have a large financial impact on the trade. Therefore, the ability of a news organization to provide the news more quickly to its subscribers or customers than the competition can be a major advantage and highly lucrative.

At first, news organizations dramatically decreased the transmission time by automating much of the transmission process and through optimization of the network. More recently, in an attempt to surpass each other and further improve their transmission speed, news organizations have focused their attention on improving the software applications and routing used to create and distribute the data (e.g., increasing line bandwidth or reducing data packet size or removing the number of servers the data travels through). However, such changes have only led to incremental improvements in end-to-end transmission time.

Therefore, there is a need for improved systems and methods for communicating, distributing or transmitting information, such as financial news, from a remotely located device to one or more recipients, end users or subscribers that reduces the end-to-end time required to send the transmission.

SUMMARY OF THE INVENTION

The inventors of the present invention have taken a unique approach at solving the aforementioned problems associated with prior art systems and methods for processing and transmitting information. Rather than obtaining incremental improvements in publication, transmission and reception time through changes in software architecture and or routing techniques, the inventors of the present invention have realized that in a lockup environment a substantial decrease in the end-to-end transmission time can be achieved by reducing the amount of time it takes to establish a connection with the distribution network after the opening of the isolation switch.

In telecommunications and computer science, serial communication is the process of sending data one bit at a time, sequentially, over a communication channel or computer bus. This is in contrast to parallel communication, where several bits of data are sent together on a link comprising several wired channels in parallel.

Typically, an Internet Protocol is used for communicating data or information from a remotely located laptop or workstation to an editorial or distribution network or directly on to one or more recipients. More specifically, an Internet Protocol, such as User Datagram Protocol (UDP) or Transmission Control Protocol (TCP) is used over the entire transmission. An IP standard was used because it was believed that lower level serial protocols, such as RS-232, were inferior since they operate at lower clock speeds.

However, the present inventors have recognized that the time required for the handshaking used to establish an IP communication link, such as an Ethernet link, between the journalist's laptop and the transmission server positioned on the other side of the isolation switch eliminates any speed advantage that high level, packet switched communication may have had over lower-level, non-packet switched, serial communication. Using for example, a UDP/IP or TCP/IP between the laptop and the transmission server after the isolation or gang switch has been opened, may take hundreds of milliseconds and it could take as long as 5 seconds for the IP connection to converge.

The present invention is directed to methods for transmitting information to a financial decision system that includes, inter alia, the steps of: generating machine readable content adapted to be received by a financial decision system; transmitting the machine readable content using a first protocol or standard; receiving the transmission of machine readable content and converting the transmission from the first protocol to a second protocol or standard; and transmitting the machine readable content using the second protocol. It is intended that the phase "adapted to be received by a financial decision system" includes, but is not limited to, applications wherein the content can be read by: electronic trading systems, such as algorithmic trading systems and quantitative trading systems; software applications, such sentiment analysis based applications; or can be displayed on devices that are read by traders and other market participants.

In certain embodiments, the first protocol is a serial protocol that does not utilize packet switching methodologies (i.e., a "non-packet switched" protocol). Preferably, the first protocol uses the RS-232 standard. Alternatively, the first protocol can use the RS-422 standard, the RS-485 standard, or any other non-packet switched protocol. It is also envisioned that the second protocol is a "packet switched" protocol and utilizes packet switching methodologies. For example, the second protocol can be Internet Protocol (IP), User Datagram Protocol (UDP), X.25, Asynchronous Transfer Mode (ATM), Multiprotocol Label Switching (MLS), Transmission Control Protocol (TCP), fire wire, Ethernet or Universal Serial Bus (USB).

Those skilled in the art will readily appreciate that "packet switching" is a network communications method that splits data traffic (digital representations of text, sound, or video) into chunks, called packets, which are then routed over a shared network that often extends over at least several meters. To accomplish this, the original message/data is segmented into several smaller packets and each packet is labeled with a destination and/or connection ID.

It is envisioned that in certain embodiments of the present invention, the step of transmitting the machine readable content using the second protocol includes transmitting the machine readable content directly to one or more end users or recipients. An end user can be for example, a financial trader, a market participant, an algorithmic trading system or an editorial network operated by a news organization. Preferably, the data or content transmitted includes, but is not limited to, machine readable data, textual data such as news alerts and newsbreakers and/or drop copy files. Machine readable content can include, but is not limited to, machine readable news, short textual alerts, elementized or tagged news feeds or any other content that contains numerical data or textual information which can be extracted and utilized by algorithmic or quantitative trading systems and/or market participants or end users or other applications.

In certain embodiments of the present invention, the method further includes the step of providing at a remote location a terminal connected to a server, wherein the terminal is used to generate the information or data, including the machine readable content, and transmitting the information using the first protocol. In such constructions, it is envisioned that the step of receiving the transmission of machine readable content and converting the transmission from the first protocol to the second protocol is performed using the server. Preferably, an isolation switch is positioned between the terminal and server and the isolation switch is controlled by a third party, such as a governmental agency. In such constructions, the method further includes the step of providing means for determining the status of communications between the remotely located terminal and the remotely located server.

In certain constructions, the remotely located terminal includes a terminal application used to generate the information to be transmitted, including the machine readable content.

It is envisioned that a second isolation switch can be positioned between the remotely located terminal and the remotely located server for disabling communication therebetween. Preferably, the second isolation switch is controlled by a user, such a journalist. In certain constructions which utilize a second isolation switch, the first isolation switch can be positioned downstream of the remotely located server.

The present invention is also directed to a system for transmitting information from a remote location to one or more recipients or end users. The system includes, inter alia, a device for generating machine readable content that adapted to be received by a financial decision system. The system further includes a mechanism for transmitting the machine readable content using a first protocol; a device for receiving the transmission of machine readable content and for converting the transmission from the first protocol to a second protocol; and a device for transmitting the machine readable content using the second protocol. Those skilled in the art will readily appreciate that the some of the functions mentioned above may be performed by a single device rather than multiple devices.

Preferably, the first protocol uses the RS-232 standard. Alternatively, the first protocol can use the RS-422 standard, the RS-485 standard or any other low-level protocol, including non-packet switched protocols. It is envisioned that the second protocol is a "packet switched" protocol in that it utilizes packet switching methodologies. For example, the second protocol can be an Internet Protocol (IP), such as for example, User Datagram Protocol (UDP) or Transmission Control Protocol (TCP).

The present invention is further directed to a system for transmitting information from a remote location to one or more recipients or end users, the system including, among other elements, a remotely located terminal, a remotely located server connected to the terminal through an isolation switch and a router connected to the server. The remotely located terminal receives information from a user, such as financial news and data, and converts it to a first data signal which includes machine readable content.

As noted above, the remotely located server is connected to the terminal through an isolation switch. The isolation switch is adapted and configured for selectively disabling communication between the server and the terminal. The server is adapted and configured for receiving the first data signal from the terminal and for converting it to a second data signal which includes the machine readable content that is adapted and configured to be read by, for example, an algorithmic trading system or a news publication system.

The router which is connected to the remote server is adapted and configured for receiving the second data signal from the server and for distributing the second data signal to respective algorithmic trading systems of one or more recipients or end users. Wherein the first data signal is transmitted from the remote terminal through the isolation switch to the remote server using a first transmission protocol and the second data signal is transmitted from the remote server to the router using a second data protocol which is different than the first data protocol.

The present invention is also directed to a method for transmitting information from a remote location to one or more recipients or end users, the method including the steps of: a) providing at a remote location a terminal connected to a server through an isolation switch, the isolation switch being adapted and configured for disabling communication between the server and the terminal; b) inputting information from a user to the remote terminal; c) converting the information to a first data signal which includes machine readable content; d) transmitting the first data signal from the remote terminal through the isolation switch to the server using a first transmission protocol; e) converting the first data signal to a second data signal which includes the machine readable content; f) transmitting the second data signal from the remote server to a router connected to the remote server using a second transmission protocol which is different than the first transmission protocol; and g) distributing the second data signal to one or more trading systems and/or display devices for use by one or more end users or applications.

The present invention is further directed to a system for transmitting information from a remote location to one or more end users, the system including, inter alia, a remotely located terminal for receiving information from a journalist and converting it to a first data signal which includes machine readable content; and a remotely located server connected to the terminal through an isolation switch. The isolation switch is adapted and configured for selectively disabling communication between the server and the terminal.

It is envisioned that the server receives the first data signal from the terminal when the isolation switch is in an open position and converts it to a second data signal that includes the machine readable content. The content may be used in many ways including with one or more trading systems and/or display devices for use by one or more end users or applications.

It is further envisioned that a wide area network (WAN) is connected to the remote server and is adapted and configured for receiving the second data signal from the server and for distributing the second data signal to one or more trading systems and/or display devices for use by one or more end users or applications. Wherein the first data signal is transmitted from the remote terminal through the isolation switch to the remote server using a first transmission protocol or standard and the second data signal is transmitted from the remote server to the WAN using a second transmission protocol or standard which is different than the first transmission protocol.

These and other aspects of the present invention will become more readily apparent to those having ordinary skill in the art from the following detailed description of the invention taken in conjunction with the drawings.

BRIEF DESCRIPTION OF THE FIGURES

So that those having ordinary skill in the art to which the subject invention pertains will more readily understand how to make and use the systems and methods disclosed herein, embodiments thereof will be described in detail below with reference to the drawings, wherein.

DETAILED DESCRIPTION OF THE PREFERRED EMBODIMENTS

Figure 1:
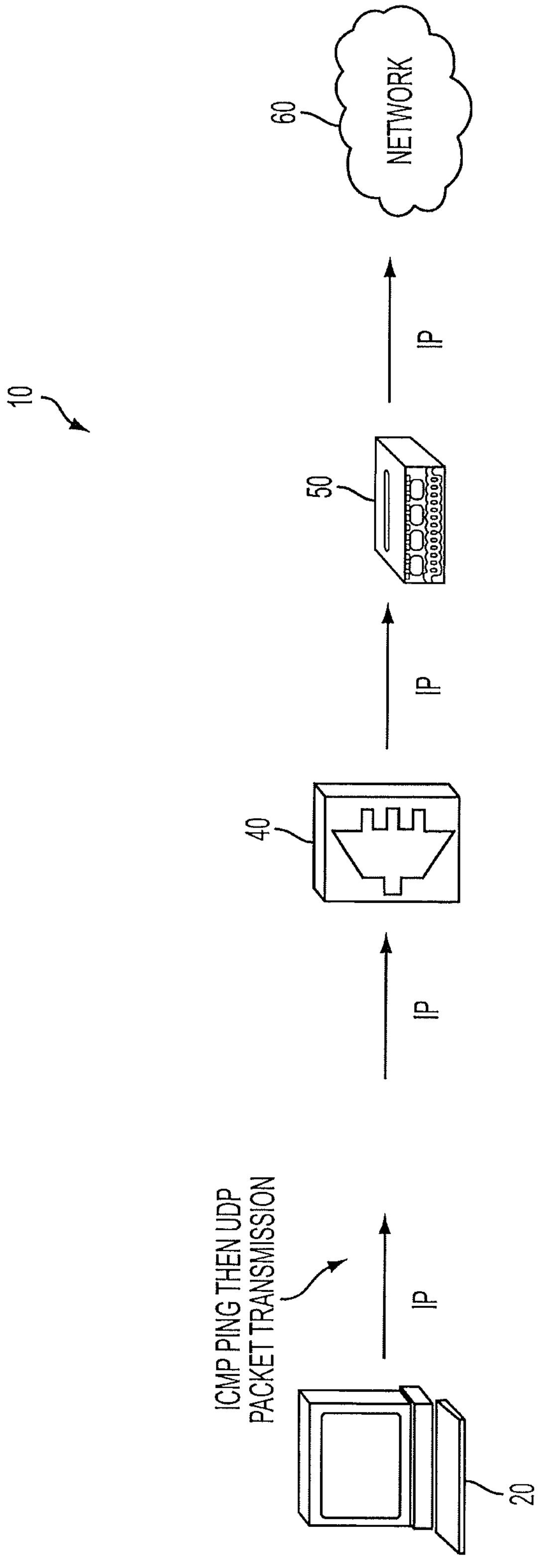
FIG. 1 provides an overview of a prior art system for transmitting information from within a lockup environment to a distribution network using an Internet protocol, such as UDP.

Referring now to FIG. 1, which provides an overview of a prior art system 10 for communicating data or information from within a lockup environment to a network and a plurality of recipients. System 10 includes a workstation 20 that is located within the lockup environment and is connected directly to an isolation switch 40. The workstation 20 forwards information (i.e., the transmission) through the isolation switch 40 to a router 50. Isolation switch 40 and router 50 may or may not be located directly within the lockup environment. The router 50 is connected to a network 60, such as a distribution or editorial network, which is adapted and configured to forward transmissions onto the intended recipients, such as the investment analysts, traders and/or an economic or algorithmic trading system.

In operation, the journalist uses the workstation 20 to create a message or transmission, which can include for example, text, economic data or other information or content. The workstation 20 includes software that creates the message, including machine readable content, which can be adapted and configured to be read by an electronic or algorithmic trading system.

A network ping, such as an ICMP ping, is used to determine if the isolation switch is open or closed. If the isolation switch 40 is closed, information can not be transmitted from the workstation 20 to the router 50. If the isolation switch 40 is open, the information or message is transmitted across system 10, from the workstation 20 to the network 60, using an Internet Protocol (IP), such as UDP/IP.

As noted above, the communication or transmission of data in system 10 from the journalist's workstation 20 to the network 60 is performed using an Internet Protocol. However, as noted previously, a disadvantage associated with prior art system 10 is that the handshaking used to establish an IP connection between the laptop 20 and router 50 after the isolation switch 40 has been opened takes at least hundreds of milliseconds and may take up to 5 seconds to converge or establish. Therefore, the transmission of time-sensitive information from within the lockup to the outside world is not optimized due the handshaking.

Figure 2:
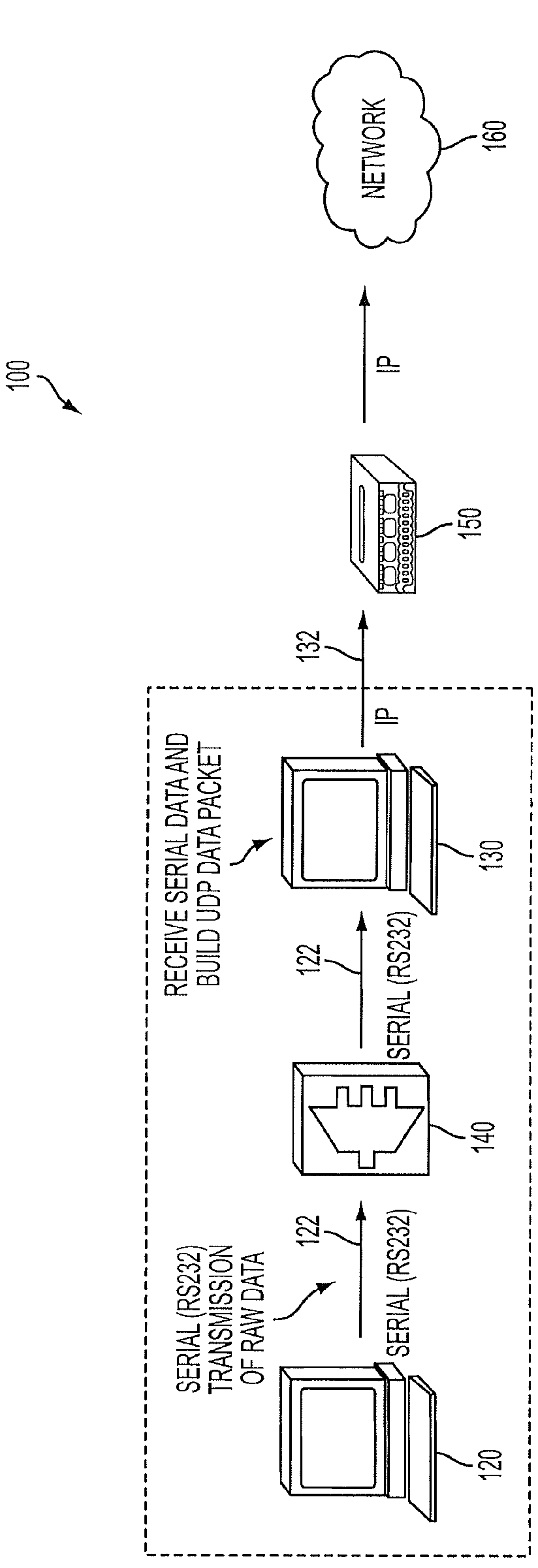
FIG. 2 provides an overview of system for transmitting or distributing information from within a lockup environment to a network, using a serial protocol for a first portion of the transmission and an Internet protocol for the second portion of the transmission.

In FIG. 2, there is illustrated a system for transmitting information from within a "no grace" lockup to a network, which has been constructed in accordance with a preferred embodiment of the present invention and designated as reference number 100. System 100 includes a remotely located workstation 120 that receives information or content from a user, such as a journalist. When a device is referred to herein as being "remotely located" it is meant that the device is positioned physically within the lockup or in close proximity thereto. In other words, the device is located remotely from the intended recipients of the data, such as the subscribers or the algorithmic trading system.

A journalist stationed within the secure lockup inputs information, such as for example, text, economic data or other content obtained during a briefing held in the lockup, into the workstation 120. The workstation 120 includes software that is adapted and configured for converting the information into a first data signal 122.

System 100 also includes a remotely located server 130 or second workstation connected to the first workstation 120 through an isolation switch 140. A box has been drawn around the terminal 120, server 130 and isolation switch to indicate that these items are remotely located. Those skilled in the art will readily appreciate that other components in system 100 may be remotely located without departing from the inventive aspects of the present disclosure.

The isolation switch 140 is adapted and configured for selectively disabling communication between the server 140 and the workstation 120 or terminal. The server 130 is adapted and configured for receiving the first data signal 122 from the workstation 120 and for converting it to a second data signal 132 which includes the machine readable content that is capable of being be read by an algorithmic trading system, a quantitative trading system or viewed on display device by a market participant or one or more end users or applications A router 150 is connected to the remote server 130 and is adapted and configured for receiving the second data signal 132 from the server and for distributing the second data signal to the network 160 and/or the intended recipient(s), including algorithmic trading systems. Those skilled in the art will readily appreciate that the router 150 can also distribute the second data signal directly to the intended recipients of the information, including among others, algorithmic trading systems.

The first data signal 122 is transmitted from the remote terminal or workstation 120 through the isolation switch 140 to the remote server 130 using a first transmission protocol and the second data signal 132 is transmitted from the remote server 130 to the router 150 using a second data protocol which is different than the first data protocol. As shown in FIG. 2, the first protocol utilizes the RS-232 standard, a non-packet switched serial protocol, and the second protocol uses an Internet Protocol, such as UDP/IP. The server 130 receives the serial data (i.e., the first data signal) and builds the UDP data packet (i.e., the second data signal).

An end user or recipient of a transmission sent using system 100 can be for example, a financial trader, market participant an algorithmic trading system, a quantitative trading system or any other application. In certain constructions, the transmission includes machine readable content such as economic data, alert and newsbreakers and/or drop copy files.

In governmental lockups, the isolation switch 140 positioned between the workstation 120 and server 130 is controlled by the governmental agency that is providing the news briefing. During the embargo period, the isolation switch 140 is closed and communication between the workstation 120 and server 130 is suspended. The communication link between the server 130 and the router 150 remains open even during the embargo period.

The workstation includes software which provides a mechanism for determining the status of communications between the remotely located terminal 120 and the remotely located server 130. For example, a Request to Send/Clear to Send (RTS/CTS) flow control application can be used which does not require a separate communication channel in order to determine the status of the isolation switch.

Figure 3:
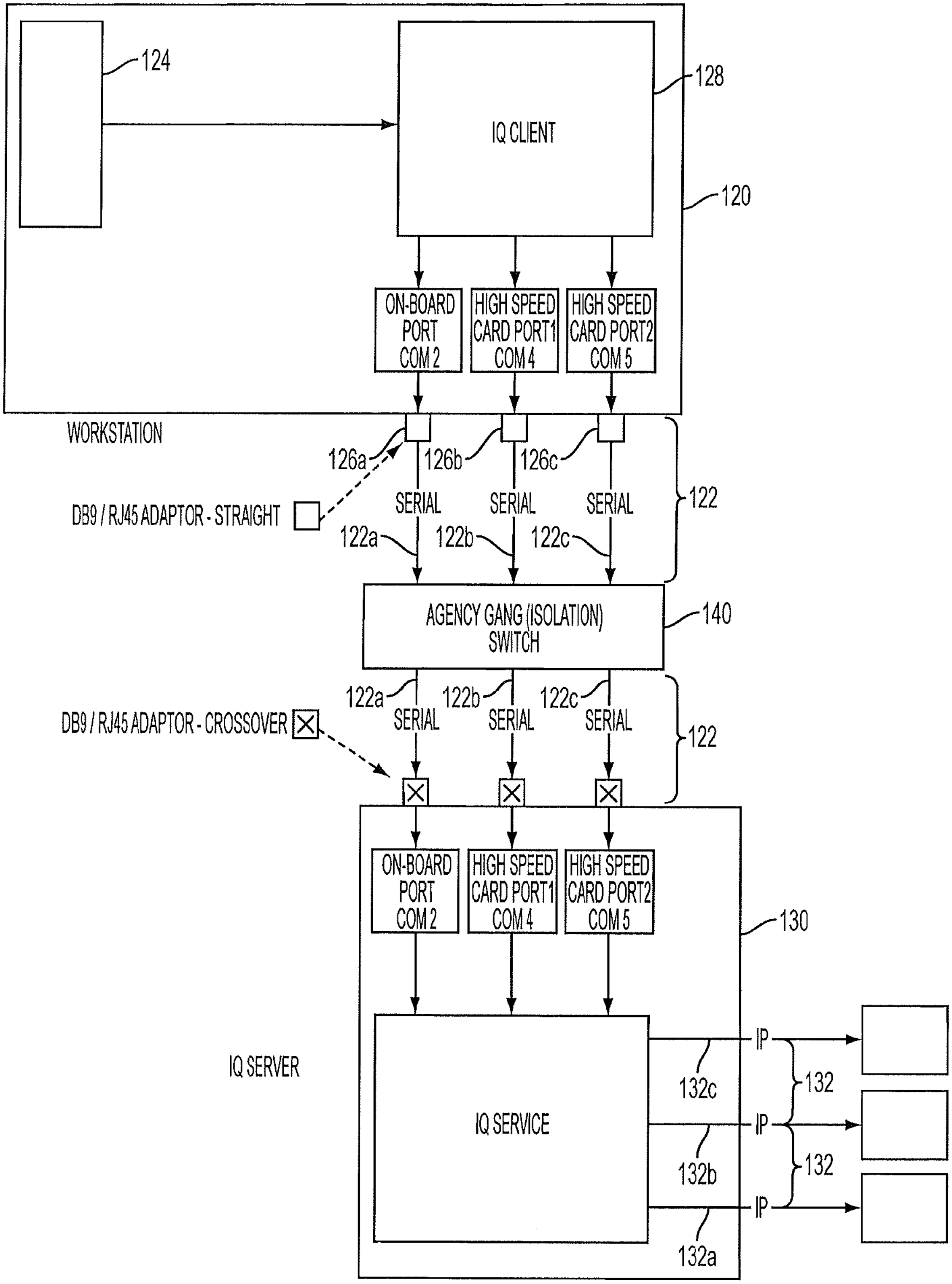
FIG. 3 provides a functional diagram of a system for transmitting or distributing information from within a "no grace" lockup to a network, which has be constructed in accordance with a preferred embodiment of the present invention.

As shown in FIG. 3, the remotely located workstation 120 includes a terminal application 124 used to generate the information (e.g., economic data, alert and newsbreakers and/or drop copy files) to be transmitted. Those skilled in the art will readily appreciate that a variety of software applications can be used for preparing the transmission without departing from the inventive aspects of the present disclosure. Moreover, the figures discussed below illustrate three separate serial communication channels originating from the laptop or workstation. However, it should be appreciated that the present invention is not limited to constructions having three communication channels, but is directed to arrangements having at least one serial communication channel emanating from the laptop or workstation.

As shown in FIG. 3, a first data transmission is sent from a first serial communication port 126*a* associated with workstation 120 to the isolation switch 140 using a first serial communication channel 122*a*. A second data transmission is sent from a second serial communication port 126*b* associated with the workstation 120 to the isolation switch 140 using a high-speed, second serial communication channel 122*b*. Lastly, a third data transmission is sent from a third serial communication port 126*c* associated with the workstation 120 to the isolation switch 140 using a high-speed, third serial communication channel 122*c*.

In certain applications of the present invention, the three separate communications in channels 122*a*, 122*b* and 122*c*, respectively, can contain identical content that is intended for separate and distinct recipients. For example, each channel 122*a*/122*b*/122*c* may be transmitting the same content (e.g., machine readable data), but the first communication channel 122*a* may be transmitting the content onto the editorial network while the second and third communication channels 122*b*/122*c* may be directly transmitting the content to algorithmic trading systems or end users. Alternatively, each channel may be transmitting different content or may be dedicated to a particular type of content. For example, the first communication channel 122*a* may be dedicated to economic data which is sent directly to an algorithmic trading system (s), while the second communication channel 122*b* is dedicated to textual data or news alerts and the third communication channel 122*c* includes drop copy files.

With continuing reference to FIG. 3, if the isolation switch 140 is open, the serial communications in channels 122*a*-122*c* proceed to the server 130 where they are received and converted into IP data signals 132*a*-132*c*.

As shown in FIG. 3, the terminal application 124 communicates with an Intelligent Queuing (IQ) client 128 application loaded on the workstation 120. The journalist will enter the data in the terminal application 124. At this point the isolation switch 140 is closed and communications between the workstation 120 and the server 130 are disabled. When the journalist has completed the communication, he/she will select to transmit the information. The data is then stored in the IQ client 128. The IQ client 128 will constantly attempt to contact the server using serial detection techniques, such as RTS/CTS auto flow control. As soon as the communications are enabled, the first data signal 122 will be sent through the isolation switch 140 to the server 130.

System 100 further includes a serial indicator which shows the current status of the connection between the server 130 and the IQ client 128. A disconnected state would indicate that the serial line 122 was cut by the isolation switch 140 positioned between the server 130 and the IQ client 128.

System 100 also includes an IP indicator, which shows the current status of the IP connection between the server 130 and the head-end systems. Any state other than connected would indicate a problem connecting to the head-end systems, which would need to be investigated.

As noted previously, in "grace" sites or grace lockups the communications through the isolation switch are restored by the third party in control of the lockup prior to the release time in order to allow some handshaking to occur in advance of the release time. For example, in some instances, the isolation switch is opened 60 seconds before the release time (providing a 60 second grace period). During that grace period, the journalists are entrusted not to initiate a transmission to the outside world. However, communications may be monitored during the grace period to ensure that no one is in violation of the honor system. If someone is found to have transmitted data before the release time, certain penalties are imposed on the individual and the news organization. Typically, an accidental first offense can be explained away, but second and subsequent violations will result in a temporary (or even permanent) ban from the lockup.

Therefore, for grace sites, a slightly different configuration of the transmission system 100 disclosed in FIG. 3 would be utilized. The problem with using system 100 in grace lockups is that the data will be released as soon as the communications are enabled (60 seconds too early in lockups that open the isolation switch 60 seconds before the release time). To prevent this from happening, a second isolation switch is required, which is controlled by the workstation user (e.g., the journalist).

Figure 4:
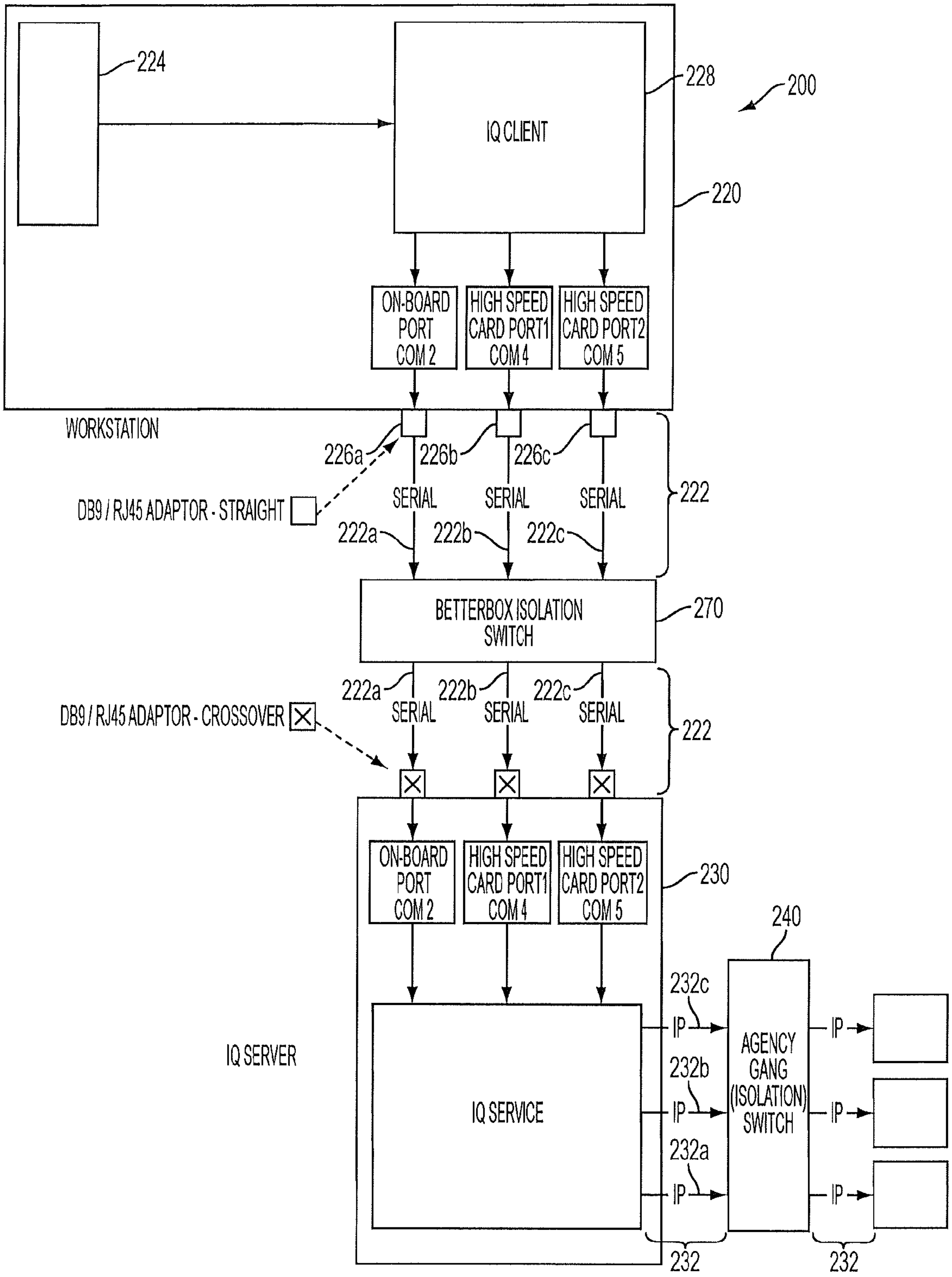
FIG. 4 provides a functional diagram of an embodiment of system for transmitting or distributing information from within a "grace" lockup to a network.

FIG. 4 provides a functional diagram of a system for transmitting or distributing information from within a "grace" lockup to a network, which has been constructed in accordance with a further embodiment of the present invention and designated as reference number 200. System 200 includes a remotely located workstation 220 that receives information or content from a user, such as a journalist. Like workstation 120, workstation 220 includes software that is adapted and configured for converting the information into a first data signal 222, which includes machine readable content.

System 200 also includes a remotely located server 230 connected to the workstation 220. However, unlike in system 100 wherein the workstation 120 is connected to the server 130 through a third party or agency controlled isolation switch 140, workstation 220 is connected to the server 230 through an isolation switch 270, which is controlled by the user of the workstation 220. Still further, agency controlled gang switch or isolation switch 240 is connected on the head-end side of the server 230. The agency controlled isolation switch 240 is adapted and configured for selectively disabling communication between the server 240 and the head-end network.

However, like server 140, server 240 is adapted and configured for receiving the first data signal 222 from the workstation 220 and for converting it to a second data signal 232 which includes the machine readable content and is adapted and configured to be read by, for example, an algorithmic trading system or displayed on a device.

The first data signal 222 is transmitted from the remote terminal or workstation 220 through the journalist controlled (BetterBox) isolation switch 270 to the remote server 230 using a first transmission or communication protocol. The second data signal 232 is transmitted from the remote server 230 to the agency controlled isolation switch 240 using a second communication protocol which is different than the first communication protocol. As shown in FIG. 4, the first protocol is a non-packet switched serial protocol, the RS-232 protocol, and the second protocol is a packet switched Internet Protocol, such as UDP/IP. The server 230 receives the serial data (i.e., the first data signal) and builds the UDP data packet (i.e., the second data signal). Like system 100, an end user of system 200 can be for example, a financial trader and/or an algorithmic trading system.

As shown in FIG. 4, the remotely located workstation 220 includes a terminal application 224 used to generate the content (e.g., machine readable data, textual data such as news alerts and newsbreakers and/or drop copy files) to be transmitted. As mentioned previously with respect to system 100, various software applications can be used for preparing the transmission without departing from the inventive aspects of the present disclosure.

As shown in FIG. 4, a first data transmission is sent from a first serial communication port 226*a* associated with workstation 220 to the isolation switch 240 using a first serial communication channel 222*a*. A second data transmission is sent from a second serial communication port 226*b* associated with the workstation 220 to the isolation switch 240 using a high-speed, second serial communication channel 222*b*. Lastly, a third data transmission is sent from a third serial communication port 226*c* associated with the workstation 220 to the isolation switch 240 using a high-speed, third serial communication channel 222*c*. If the isolation switch 270 is open, the serial communications in channels 222*a*-222*c* proceeds to the server 230 where they are received and converted into IP data signals 232*a*-232c.

As shown in FIG. 4, the terminal application 224 communicates with an Intelligent Queuing (IQ) client 228 application loaded on the workstation 220. The journalist will enter the data in the terminal application 224. At this point the isolation switch 270 is closed and communications between the workstation 220 and the server 230 are disabled. When the journalist has completed the communication, he/she will select to transmit the information. The data is then stored in the IQ client 228. The IQ client 228 will constantly attempt to contact the server using serial detection techniques, such as RTS/CTS auto flow control. After the release time, the journalist will open isolation switch 270. As soon as the communications are enabled, the first data signal 222 will be sent through the isolation switch 270 to the server 230.

The use of system 200 in "grace" lockups has several advantages over the prior art. For example, when the client application is configured to use TCP/IP, such as in prior art architectures, and the communications are disabled (by the agencies isolation switch), the client application will continually freeze, with brief gaps where the user can work. To prevent the freezing, the network card has to be disabled. When communications are restored, the network card then has to be enabled. In system 200, the terminal application will not freeze as the terminal application is in constant communication with the IQ Client. This means that the user does not have to disable/enable the network card.

Still further, in prior art systems, when the user elects to transmit the information in the terminal application at the release time, there is a slight delay before the data is sent due to the time needed for the handshaking. Lastly, the terminal application can be configured to first release the economic data or machine readable data, then subsequently release the rest of the transmission, such as the new alerts and drop copy files. Then IQ Client sends all three data feeds at the same time (in parallel) over three separate communication channels. Those skilled in the art will readily appreciate that a single channel can also be used for the transmission of the three data feeds.

Figure 5:
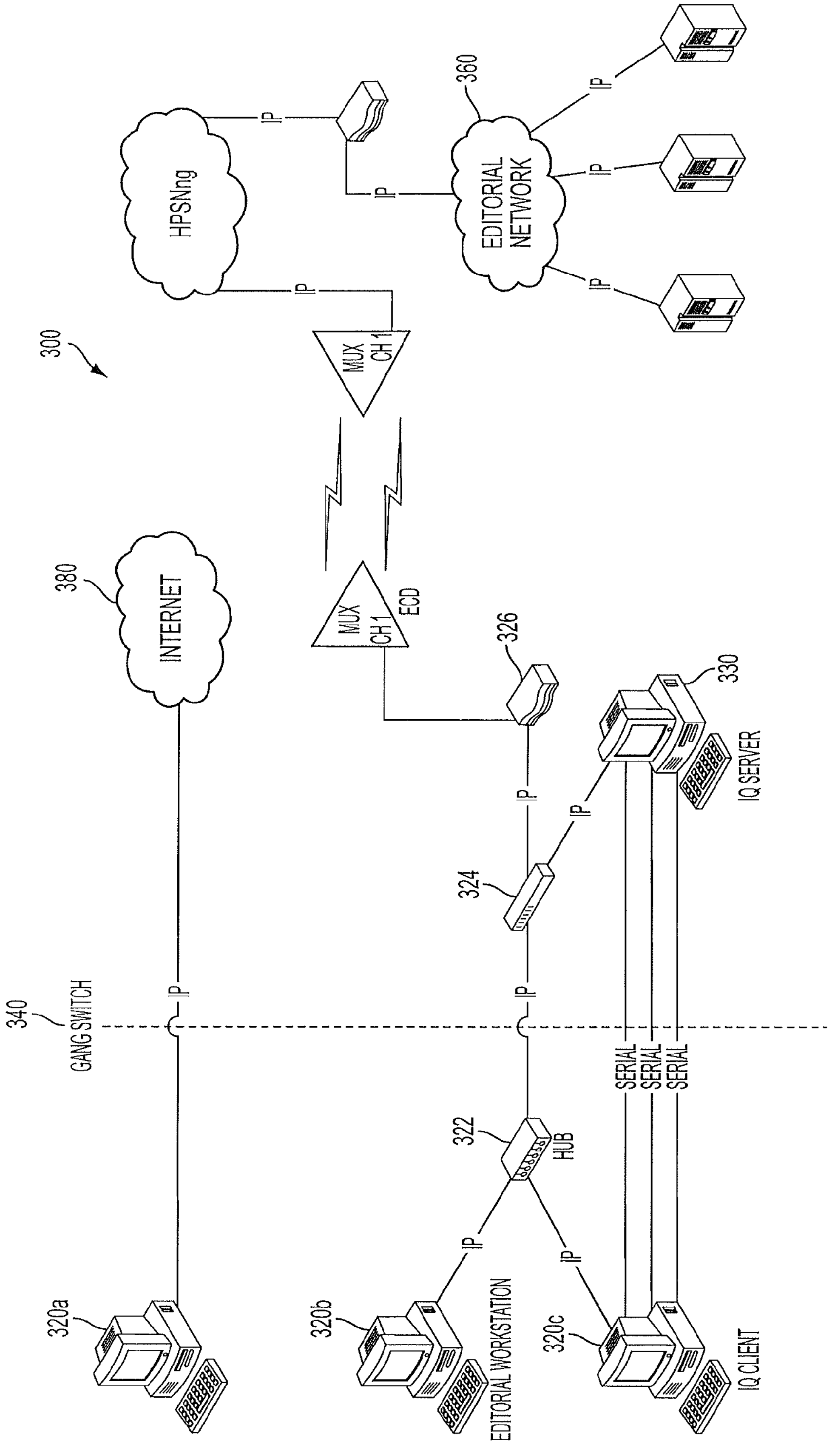
FIGS. 5 and 6 provide schematics for two embodiments of the present invention, wherein systems and methods disclosed herein are employed in a "no grace" lockup environment.
Figure 6:
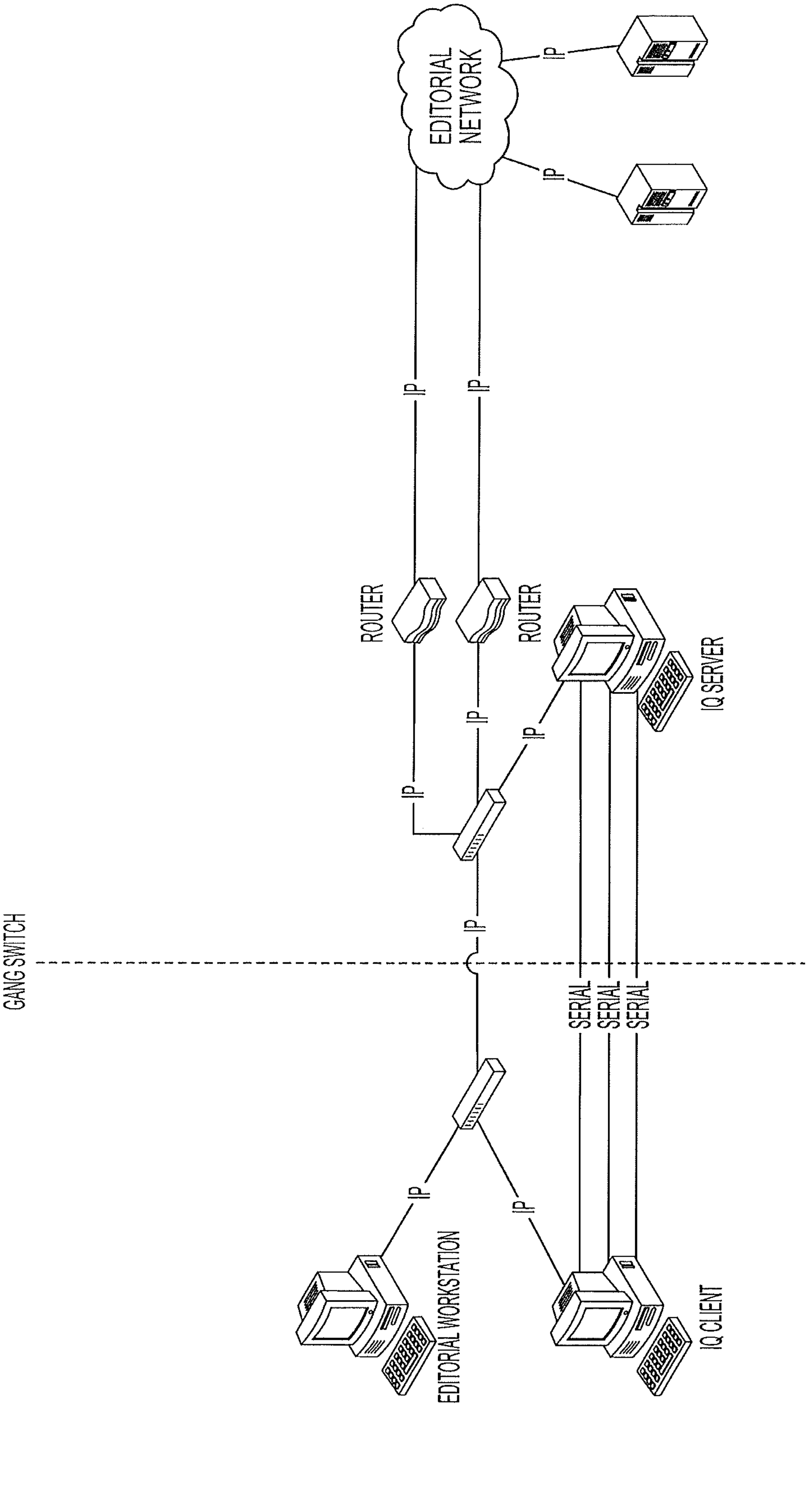
Figure 7:
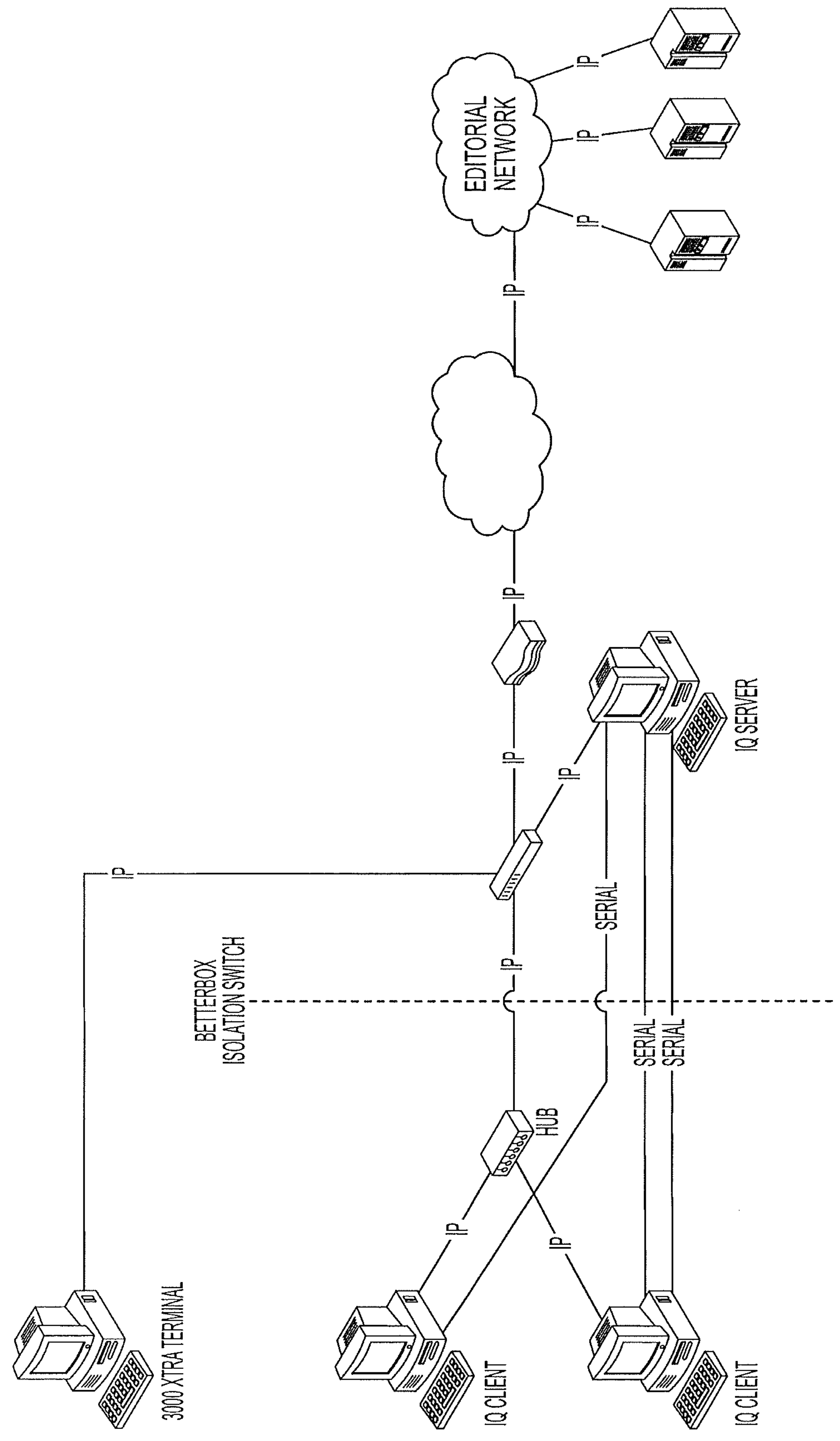
FIGS. 7 and 8 provide schematics for two embodiments of the present invention, wherein systems and methods disclosed herein are employed in a "grace" lockup environment
Figure 8:
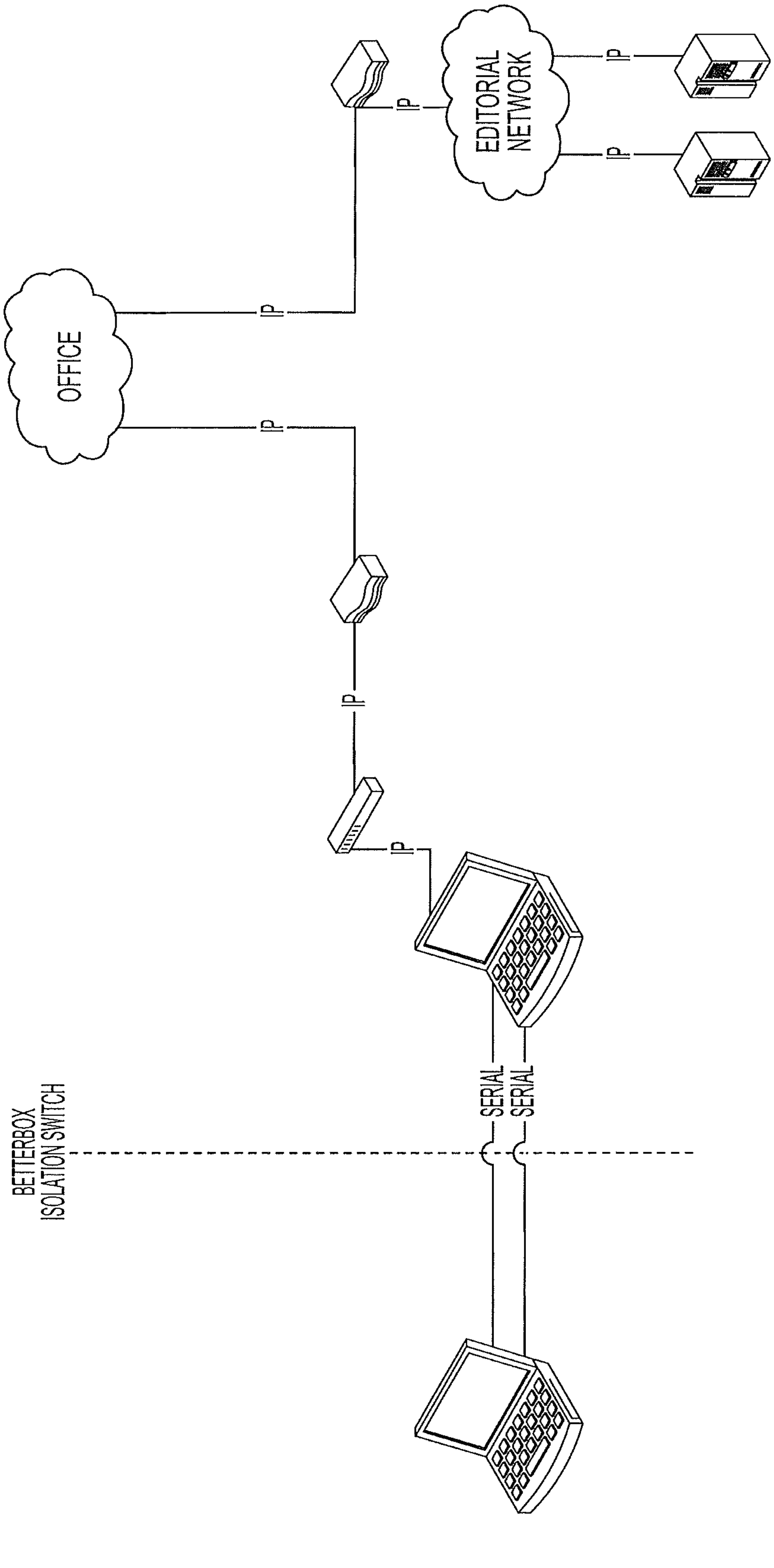

FIGS. 5 and 6 provide schematics for two embodiments of the present invention, wherein the systems and methods disclosed herein are employed in a "no grace" lockup environment. FIGS. 7 and 8 provide schematics for two embodiments of the present invention used in a "grace" lockup environment.

FIG. 5 illustrates that within the lockup environment, several workstations can be installed which communicate in different manners with network devices positioned on the other side of the isolation switch and the editorial network. In system 300, a first workstation 320*a* uses IP to communicate through the isolation switch 340 directly with the Internet 380. A second editorial workstation 320*b* can be used, for example, to create and transmit information which is not as time sensitive to the editorial network using UDP/IP. This information is transmitted from the workstation 320*b* through a hub 322 and across the isolation switch 340 to port 324. From port 324 the transmission precedes to a router 326 and on to the head-end editorial network 360. A third workstation 330*c* uses non-packet switched serial communication to transmit time sensitive data through the isolation switch 340 to server 330, wherein the information is converted into, for example, UDP/IP packets and is transmitted on to the head end devices and editorial network 360 or directly to subscribers.

FIGS. 6-8 provide alternative configurations for information processing and transmission systems that utilizes either system 100 or system 200 in no-grace (FIG. 6) or grace lockups (FIGS. 7 and 8). These figures are intended to illustrate that the systems and methods disclosed herein can be utilized in a variety of lockup arrangements without departing from the inventive aspects of the present disclosure.

Although exemplary and preferred aspects and embodiments of the present invention have been described with a full set of features, it is to be understood that the disclosed systems and methods may be practiced successfully without the incorporation of each of those features. Thus, it is to be understood that modifications and variations may be utilized without departure from the spirit and scope of the invention and methods disclosed herein, as those skilled in the art will readily understand. Such modifications and variations are considered to be within the purview and scope of the appended claims and their equivalents.

What is claimed is:

1. A method for transmitting information to a financial decision system, comprising the steps of:

a) generating machine readable content adapted to be received by a financial decision system;

b) transmitting the machine readable content using a first non-packet switched serial protocol through an isolation switch;

c) receiving the transmission of machine readable content and converting the transmission from the first protocol to a second packet switched serial protocol after the transmission has passed through the isolation switch; and d) transmitting the machine readable content using the second protocol.

2. The method as recited in claim 1, wherein the first protocol is chosen from the group consisting of RS-232, RS-422 and RS-485.

3. The method as recited in claim 1, wherein the second protocol is an Internet Protocol.

4. The method as recited in claim 1, wherein the second protocol is Transmission Control Protocol (TCP) or User Datagram Protocol (UDP).

5. The method as recited in claim 1, wherein the step of transmitting the machine readable content using the second protocol includes transmitting the machine readable content to one or more recipients.

6. The method as recited in claim 1, wherein the machine readable content comprises economic data.

7. The method as recited in claim 1, further comprising the step of: providing at a remote location a terminal connected to a server, wherein the terminal is used by a user to generate the machine readable content and transmit the machine readable content using the first protocol.

8. The method as recited in claim 7, wherein the step of receiving the transmission of machine readable content and converting the transmission from the first protocol to the second protocol is performed using the server.

9. The method as recited in claim 7, further comprising the step of transmitting the machine readable content using the first protocol from the terminal to the server when the first isolation switch is in an open position.

10. The method as recited in claim 7, further comprising the step of providing a terminal application used to generate the machine readable content within the remotely located terminal.

11. The method as recited in claim 7, further comprising the step of determining the status of communications between the remotely located terminal and the server in the remotely located terminal.

12. The method as recited in claim 1, further comprising the step of transmitting the machine readable content using the first protocol from the terminal to the server when the isolation switch is in an open position.

13. A method for transmitting information to a financial decision system as recited in claim 1 wherein the transmitting the machine readable content step further includes transmitting the machine readable content having the first non-packet switched serial protocol using a plurality of serial ports and channels.

14. A system for transmitting information from a remote location to one or more end users or recipients, the system comprising:

a first terminal operative to generate machine readable content adapted to be received by a financial decision system and for transmitting the machine readable content using a first non-packet switched serial protocol;

an isolation switch coupled to the first terminal; and a second terminal coupled to the isolation switch, the second terminal being operative to receive the transmission of machine readable content in a first non-packet switched serial protocol and for converting the transmission from the first non-packet switched serial protocol to a second packet switched serial protocol after the transmission has past through the isolation switch and to transmit the machine readable content using the second packet switched serial protocol.

15. The system as recited in claim 14, wherein the first protocol is chosen from the group consisting of RS-232, RS-422 and RS-485.

16. The system as recited in claim 14, wherein the second protocol is an Internet Protocol.

17. The system as recited in claim 14, wherein the second protocol is Transmission Control Protocol (TCP) or User Datagram Protocol (UDP).

18. The system as recited in claim 14, wherein the second terminal operative to transmit the machine readable content using the second protocol is further operative to transmit the machine readable content to one or more recipients.

19. The system as recited in claim 14, wherein the machine readable content comprises economic data.

20. The system as recited in claim 14, wherein the first terminal operative to generate the machine readable content and transmitting the machine readable content using the first protocol includes a remotely located terminal connected to a server.

21. The system as recited in claim 20, wherein the second terminal operative to receive the transmission of machine readable content and converting the transmission from the first protocol to the second protocol is performed using the server.

22. The system as recited in claim 20, wherein the first remotely located terminal includes a terminal application used to generate the machine readable data.

23. The system as recited in claim 20 wherein the first terminal is operative to determine the status of communications between the first terminal and the second terminal.

24. A system for transmitting information from a remote location to one or more end users or recipients as recited in claim 14 further including a plurality of serial ports and channels provided in the first terminal operative to transmit the machine readable content using a first non-packet switched serial protocol from the first terminal to the second terminal.

25. A system for transmitting information from a remote location to one or more recipients or end users, the system comprising:

a) a remotely located terminal for receiving information from a user and converting it to a first non-packet switched serial data signal which includes machine readable content;

b) a remotely located server connected to the terminal through an isolation switch which is adapted and configured for selectively disabling communication between the server and the terminal; the server being adapted and configured for receiving the first non-packet switched serial data signal from the terminal and for converting it to a second packet switched serial data signal which includes the machine readable content after the non-packet switched serial data signal has past through the isolation switch; and c) a router connected to the remote server and adapted and configured for receiving the second packet switched serial data signal from the server and for distributing the second packet switched serial data signal to respective one or more recipients.

26. A method for transmitting information from a remote location to one or more end users, the method comprising the steps of:

a) providing at a remote location a terminal connected to a server through an isolation switch, the isolation switch being adapted and configured for disabling communication between the server and the terminal;

b) inputting information from a user to the remote terminal;

c) converting the information to a first non-packet switched serial data signal which includes machine readable content;

d) transmitting the first non-packet switched serial data signal from the remote terminal through the isolation switch to the server;

e) converting the first non-packet switched serial data signal to a second packet switched serial data signal which includes the machine readable content after the non-packet switched serial data signal has past through the isolation switch and is adapted and configured to be read by an algorithmic trading system;

f) transmitting the second packet switched serial data signal from the remote server to a router connected to the remote server; and g) distributing the second data signal to respective trading systems of one or more end users.

27. A method for transmitting information from a remote location to one or more end users as recited in claim 26 wherein the transmitting the first non-packet switched data signal includes using a plurality of serial ports and channels to transmit the first non-packet switched data signal from the remote terminal through the isolation switch to the server.

28. A system for transmitting information from a remote location to one or more end users, the system comprising:

a) a remotely located terminal for receiving information from a journalist and converting it to a first non-packet switched serial data signal which includes machine readable content;

b) a remotely located server connected to the terminal through an isolation switch, the isolation switch being adapted and configured for selectively disabling communication between the server and the terminal; the server receiving the first non-packet switched serial data signal from the terminal when the isolation switch is in an open position and converting it to a second packet switched serial data signal that includes the machine readable content which is adapted and configured to be read by an algorithmic trading system after the non-packet switched serial data signal has past through the isolation switch; and c) a wide area network (WAN) connected to the remote server and adapted and configured for receiving the second packet switched serial data signal from the server and for distributing the second packet switched serial data signal to respective algorithmic trading systems of one or more end users.

29. A system for transmitting information from a remote location to one or more end users or recipients as recited in claim 28 further including a plurality of serial ports and channels provided in the remotely located terminal operative to transmit the machine readable content using a first non-packet switched serial data signal from the remotely located terminal to the remotely located server.

* * * * *